Patented Jan. 12, 1943

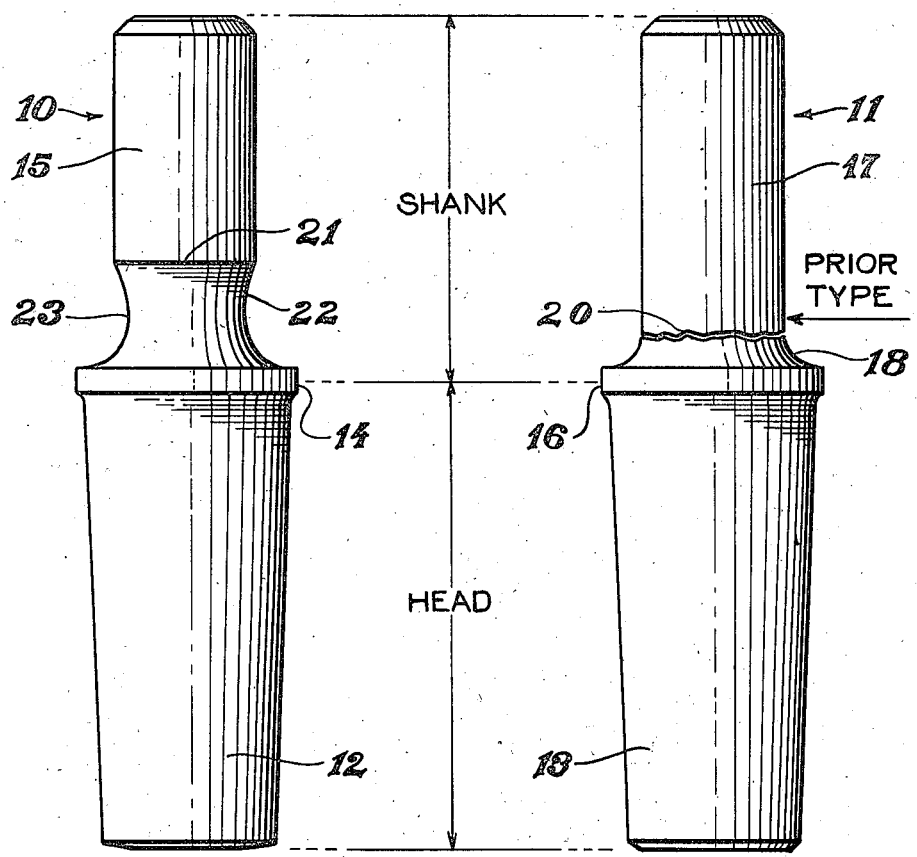

2,307,796

UNITED STATES PATENT OFFICE 2,307,796

RIVET SET

Matthew M. Kennedy, Philadelphia, and James E. McCambridge, Drexel Hill, Pa.

Application July 22, 1941, Serial No. 403,549

6 Claims. (Cl. 78—46)

(Granted under the act of March 3, 1883, as amended April 30, 1928; 370 O. G. 757)

This invention relates to a rivet set, and has for an object to provide an improved rivet set of great durability.

A further object of this invention is to provide a rivet set whose life is many times the life of the prior rivet set, although it differs from the prior rivet set in what appears to be but a slight change in shape.

The life of the prior rivet set in actual practice was found to be extremely limited, serious breakage of such prior rivet sets having been experienced during a large job, the failure of such prior rivet sets being so rapid as to make the cost almost prohibitive. As one example, it was found that a rivet set failed after driving a total of only forty-seven 1¼" diameter countersunk H. T. S. rivets, while the rivet set of the present invention has averaged approximately 11,000 similar rivets without failure.

With the foregoing and other objects in view, the invention consists in the construction, combination and arrangement of parts hereinafter described and illustrated in the drawing, in which:

Fig. 1 is an elevational view of the improved rivet set of this invention; and

Fig. 2 is a similar view of the rivet set of the prior art.

There is shown at 10 the improved rivet set of this invention, while there is shown at 11 the prior type of rivet set over which the present invention is an improvement. The head 12 of this rivet set is identical with head 13 of the prior type set 11 and is connected through a flange 14 to the shank 15, just as in the prior type the head 13 is connected through a flange 16 to the shank 17.

In the prior type the shank 17 joins the enlarged flange 16 by means of an abrupt fillet 18. With this prior type of fillet it was found that the life of this rivet set is very short, breakage of this rivet set usually occurring along the line 20 after only a very limited number of rivets had been operated on, the number of operations often being less than one hundred. While investigating such failure it was found that the breakage was apparently due to stress concentration at this fillet 18 between the shank 17 and the head 13 of the rivet set 11. It was concluded that if this stress concentration could be reduced, breakage would stop and the life of the rivet set would be prolonged. With this thought in mind, the idea was conceived of reducing the stress concentration at the fillet 18 between the shank 17 and the head 13 by recessing the shank at this point and forming a larger and more gradual fillet.

Accordingly, the fillet connecting the shank 15 of the improved rivet set 10 to the flange 14 and head 12 commences from a point 21 at a substantial distance from the flange 14. From this point 21 the fillet 22 is first recessed to the point 23 and then merges gradually out toward the flange 14. Comparing the fillet 22 of this improved rivet set invention 10 with the fillet 18 of the prior type rivet set 11, it will be observed that the length of the improved fillet 22 is about three times the length of the prior fillet 18, and in addition it reduces the diameter of the shank 15 a slight amount before it gradually enlarges again to meet the flange 14.

With this apparently simple change in shape, the life of this rivet set has been found to be hundreds of times longer than the life of the rivet set 11 of the prior art.

In operation, the new rivet set 10 is used in the identical manner that the old rivet set 11 was used; that is, the shank 15 is inserted into the pneumatic hammer and the head 12 is operated against the rivet being peaned over, the only difference in operation being that with the prior type of rivet set a new rivet set had to be inserted in the pneumatic hammer after every fifty to one hundred rivets, while the rivet set 10 operates on thousands of rivets without change.

Other modifications and changes in the number and arrangement of the parts may be made by those skilled in the art without departing from the nature of this invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. In a rivet set consisting of a head, a fillet, a flange, and a shank connected to the flange by the fillet, the improvement of an enlarged gradual and slightly recessed fillet.

2. In a rivet set consisting of a head, a fillet, a flange, and a shank connected to the flange by the fillet, the improvement of an enlarged gradual and slightly recessed fillet, said fillet having a width several times the depth thereof.

3. In a rivet set consisting of a head, a fillet, a flange, and a shank connected to the flange by the fillet, the improvement of said fillet comprising a shallow annular groove.

4. A rivet set comprising a riveting head, a flange, a shank and a fillet connecting the shank to the flange, said fillet comprising a shallow annular groove.

5. A rivet set comprising a riveting head, a flange, a shank, and a fillet connecting the shank to the flange, said fillet comprising a shallow annular groove, said groove extending somewhat below the peripheral surface of said shank.

6. A rivet set comprising a riveting head, a flange, a shank, and a fillet connecting the shank to the flange, said fillet comprising a shallow annular groove, said groove extending somewhat below the peripheral surface of said shank, one side of said groove merging gradually into said flange.

MATTHEW M. KENNEDY.
JAMES E. McCAMBRIDGE.